Patented Mar. 6, 1951

2,543,747

UNITED STATES PATENT OFFICE 2,543,747

PREPARATION OF N.N'-DIARYL DERIVATIVES OF PERYLENE DIIMID

Marvin O. Shrader, Westfield, N. J., assignor to General Aniline & Film Corporation, New York, N. Y., a corporation of Delaware No Drawing. Application August 27, 1948, Serial No. 46,553

8 Claims. (Cl. 260—281)

1

The present invention relates to the preparation of N.N'-diaryl derivatives of perylene diimid by a reaction effected by utilizing water as the diluent.

N.N'-diaryl derivatives of perylene diimid are valuable as vat dyestuffs because of their ability to yield dyeings in bright red shades of good fastness properties.

These dyestuffs are generally prepared by the method described in German Patent 386,057, involving a reaction between perylene tetracarboxylic acid or the dianhydride thereof with the desired amine while utilizing an excess of the amine as the solvent. The reaction proceeds according to the following scheme:

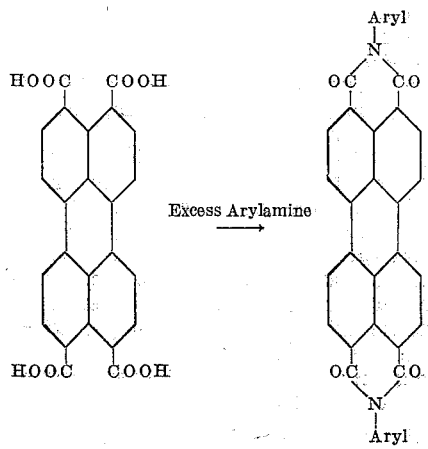

This method is disadvantageous for the reason that it requires a separate step for the recovery of the excess arylamine for re-use in the process. Furthermore, in such a recovery step quantities of the arylamine will inevitably be lost and since the arylamine is an expensive product, the overall efficiency of the process is thereby decreased.

Perylene tetracarboxylic acids and the dianhydrides thereof are notoriously insoluble in water. It is generally recognized that most chemical reactions can only proceed where the reactants used are in solution. Due to the extreme insolubility of the perylene tetracarboxylic acid or its anhydride in water it was surprising, to say the least, that the reaction of these components with an arylamine in the preparation of the corresponding diimids could be effected. More surprising still, is the fact that not only does the reaction take place, but that it does so while giving almost quantitative yields of the end product, said product, moreover, having approximately equal dyeing quality with that obtained according to the aforesaid German patent and far superior printing properties.

The preparation of N.N'-diaryl derivatives of perylene diimid by heating a perylene tetracarboxylic acid or the dianhydride thereof with an arylamine with water as the diluent accordingly constitutes the purposes and objects of the present invention.

The reaction between the perylene tetracarboxylic acid or the dianhydride thereof with the arylamine may be effected by refluxing the reactants in the presence of water or, better still, by heating the reactants in the presence of water under pressure which may be supplied by a closed vessel. The temperature at which the reactants are heated in the latter procedure ranges from about 130–150° C. Pressures of the order of about 30–40 lbs. per square inch have been found to yield excellent results.

It has been ascertained that the reaction proceeds at optimum speed and while yielding superior products if the perylene tetracarboxylic acid starting material is used in the form obtained by precipitation from its alkaline salt such as a sodium, potassium, lithium or like salt. For effecting the precipitation there may be used hydrochloric acid, sulfuric acid, acetic acid, formic acid and the like. Apparently, when so precipitated the perylene tetracarboxylic parent material is in an extremely finely divided condition which facilitates its conversion by the arylamine.

In lieu of the perylene tetracarboxylic acid itself or the dianhydride thereof, there may also be used derivatives of the perylene tetracarboxylic acid such as the mono-, di-, tetra- and other poly-chlor and brom derivatives thereof.

The arylamine employed is a mono-primary arylamine, preferably of the benzene and naphthalene series. Suitable arylamines are aniline, p-anisidine, p-chlor aniline, p-ethoxy aniline, dichlor aniline, toluidine, p-ethyl aniline, sulfanilic acid, metanilic acid, α- and β-naphthylamines, and the like.

The following series of reactions serve to illustrate a possible mechanism of the reaction involved. It is to be understood, however, that such reaction is merely theoretical and consequently is not to be construed as a limitation of the invention.

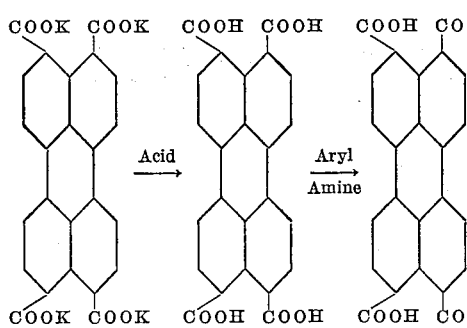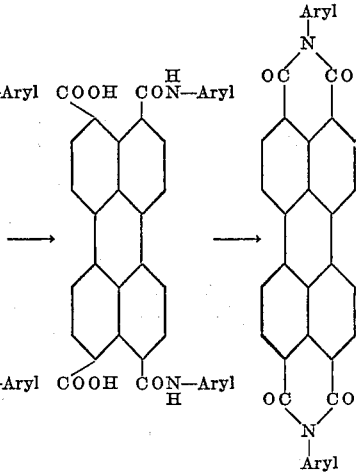

The invention is illustrated by the following examples in which the parts are by weight.

Example 1

Perylene tetracarboxylic acid anhydride was dissolved in dilute alkali by heating to 90° C. a mixture consisting of 19.6 parts of the anhydride, 20 parts of caustic potash and 350 parts of water. The solution was cooled to 50° C. and the perylene tetracarboxylic acid precipitated by pouring the solution into a mixture of 26.3 parts of glacial acetic acid, 18.5 parts of p-anisidine and 100 parts of water. The result is an orange precipitate or slurry which may possibly be an amine salt of the tetra-perylene tetracarboxylic acid. This slurry is heated in a pressure vessel at 140–145° C. and about 40 pounds pressure for 5 hours, the N.N'-diaryl perylene diimid being formed in nearly quantitative yields. The dyestuff is approximately equal in dyeing quality and is far superior in printing properties to the dyestuff obtained by heating a mixture of perylene tetracarboxylic acid with excess amine according to German Patent 386,057.

Example 2

The procedure is the same as in Example 1 excepting that 21.4 parts of monochlor (8.8% chlorine) perylene tetracarboxylic acid anhydride is used instead of the perylene tetracarboxylic acid anhydride. The dyestuff obtained is yellower than that formed in Example 1.

Example 3

The procedure is the same as in Example 1 excepting that 19.1 parts of p-chloraniline is used instead of p-anisidine and the pressure vessel is heated for 15 hours instead of for 5 hours. The yield of the perylene diimid is nearly quantitative.

Example 4

The procedure is the same as in Example 1 excepting that the reaction mixture is refluxed instead of being heated under pressure. The quality of the dyestuff obtained is slightly inferior to that produced in Example 1.

Example 5

A mixture consisting of 19.6 parts of dry perylene tetracarboxylic acid, precipitated by acidifying a solution of the potassium salt with acetic acid, 18.6 parts of p-anisidine and 500 parts of water was heated in a pressure vessel at 140–145° C. and 40 pounds pressure for 5 hours. The yield of the dyestuff is less than that obtained when the perylene tetracarboxylic acid is not dried before forming the diimid. The printing properties of this sample of dyestuff were not as good as the sample prepared in Example 1.

Example 6

19.6 parts of perylene tetracarboxylic acid was dissolved in chlorsulfonic acid and after drowning on ice was filtered and washed neutral. The wet filter cake was then worked up with p-anisidine in a pressure vessel as in Example 5. The yield of dyestuff was not quite as good as that obtained in Example 1.

Modifications of the invention will occur to persons skilled in this art, and I therefore do not intend to be limited in the patent granted except as necessitated by the appended claims.

I claim:

1. The process of preparing N.N'-diaryl derivatives of perylene tetracarboxylic acid diimids, which comprises heating a compound selected from the class consisting of a perylene tetracarboxylic acid and the dianhydride thereof with an arylamine while utilizing water as the diluent until diimid formation occurs, the water being present from the time that heating is commenced.

2. The process of preparing N.N'-diaryl derivatives of perylene tetracarboxylic acid diimids, which comprises precipitating a perylene tetracarboxylic acid from an aqueous solution of its alkali salt by means of an acid in the presence of an arylamine and heating the resulting aqueous slurry until diimid formation occurs while utilizing the water in said slurry as a diluent.

3. The process of preparing N.N'-diaryl derivatives of perylene tetracarboxylic acid diimids, which comprises precipitating a perylene tetracarboxylic acid from an aqueous solution of its alkali salt by means of an acid, adding an arylamine to the aqueous mixture and heating the resulting aqueous slurry until diimid formation occurs while utilizing the water in said slurry as a diluent.

4. The process of preparing N.N'-diaryl derivatives of perylene tetracarboxylic acid diimids, which comprises precipitating the perylene tetracarboxylic acid from its alkaline salt by means of an acid, isolating the perylene tetracarboxylic acid, and heating the perylene tertacarboxylic acid with an arylamine in the presence of water as a diluent until diimid formation occurs, the water being present from the time that heating is commenced.

5. The process of preparing dyestuffs of the following general formula, in which a hydrogen atom is replaced by halogen,

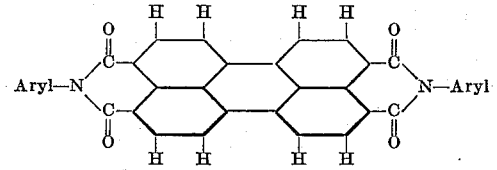

which comprises heating the halogen-substituted perylene tetracarboxylic acid with an arylamine while using water as the diluent from the time that heating is commenced.

6. The process as defined in claim 1, wherein the heating is effected in a closed vessel under pressure.

7. The process as defined in claim 2, wherein the heating is effected under pressure in a closed vessel.

8. The process of preparing N.N'-diaryl derivatives of perylene tetracarboxylic acid diimid suitable for printing pastes, which comprises precipitating perylene tetracarboxylic acid from an aqueous solution of its potassium salt by means of acetic acid and heating the resulting aqueous suspension with an arylamine to a temperature of about 140–145° C. under pressure of about 40 pounds per square inch while using the water in said suspension as a diluent.

MARVIN O. SHRADER.

REFERENCES CITED

The following references are of record in the file of this patent:

UNITED STATES PATENTS

| Number | Name | Date |
|---|---|---|
| 1,913,052 | Jaeger et al. | June 6, 1933 |

FOREIGN PATENTS

| Number | Country | Date |
|---|---|---|
| 100,706 | Switzerland | Aug. 16, 1923 |
| 101,756 | Switzerland | Oct. 16, 1923 |
| 101,757 | Switzerland | Oct. 16, 1923 |
| 101,759 | Switzerland | Oct. 16, 1923 |
| 101,760 | Switzerland | Oct. 16, 1923 |
| 101,761 | Switzerland | Oct. 16, 1923 |
| 101,763 | Switzerland | Oct. 16, 1923 |
| 101,764 | Switzerland | Oct. 16, 1923 |
| 105,852 | Switzerland | July 1, 1924 |